US011064084B2

(12) United States Patent
Obata

(10) Patent No.: US 11,064,084 B2
(45) Date of Patent: Jul. 13, 2021

(54) IMAGE FORMING APPARATUS CAPABLE OF REDUCING TIME OF SHIFT TO LOW-POWER CONSUMPTION OPERATION MODE, METHOD OF CONTROLLING SAME, AND STORAGE MEDIUM

(71) Applicant: CANON KABUSHIKI KAISHA, Tokyo (JP)

(72) Inventor: Shuji Obata, Noda (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/944,631

(22) Filed: Jul. 31, 2020

(65) Prior Publication Data

US 2021/0067653 A1 Mar. 4, 2021

(30) Foreign Application Priority Data

Sep. 3, 2019 (JP) ............................ JP2019-160642

(51) Int. Cl.
*G06F 3/12* (2006.01)
*H04N 1/00* (2006.01)

(52) U.S. Cl.
CPC ....... *H04N 1/00896* (2013.01); *H04N 1/0097* (2013.01)

(58) Field of Classification Search
None
See application file for complete search history.

(56) References Cited

U.S. PATENT DOCUMENTS

| | | | | |
|---|---|---|---|---|
| 7,555,662 | B2 | 6/2009 | Kidoguchi | |
| 10,652,418 | B2 * | 5/2020 | Hikichi | H04N 1/00928 |
| 2006/0236143 | A1 * | 10/2006 | Kidoguchi | G06F 1/3203 713/320 |
| 2013/0201510 | A1 * | 8/2013 | Miyata | G06F 3/1278 358/1.13 |
| 2013/0229684 | A1 * | 9/2013 | Yasuzaki | H04N 1/00896 358/1.15 |
| 2014/0036294 | A1 * | 2/2014 | Takatani | H04N 1/00928 358/1.13 |

(Continued)

FOREIGN PATENT DOCUMENTS

JP 2006259906 A 9/2006

*Primary Examiner* — Henok Shiferaw
(74) *Attorney, Agent, or Firm* — Rossi, Kimms & McDowell LLP

(57) ABSTRACT

An image forming apparatus capable of reducing execution time of a process for shifting the image forming apparatus from a normal operation mode to a low-power consumption operation mode. A sub interrupt controller 113 is connected to units and performs notification to a sub CPU in accordance with occurrence of a return trigger in any of the units. When shifting from the normal operation mode to the low-power consumption operation mode, a main CPU transmits mode instruction information indicative of the low-power consumption operation mode to the sub CPU. The sub CPU stores one or a plurality of units associated with the low-power consumption operation mode in advance, and sets one or a plurality of units in the sub interrupt controller, based on the mode instruction information and the plurality of units stored in association with the low-power consumption operation mode.

17 Claims, 8 Drawing Sheets

(56) References Cited

U.S. PATENT DOCUMENTS

| | | | | |
|---|---|---|---|---|
| 2014/0118768 | A1* | 5/2014 | Yokomizo | H04N 1/4433 358/1.13 |
| 2017/0060215 | A1* | 3/2017 | Yanagawa | G06F 1/3284 |
| 2018/0220035 | A1* | 8/2018 | Chitpasong | H04N 1/32673 |
| 2019/0394341 | A1* | 12/2019 | Takahashi | H04N 1/00244 |

* cited by examiner 100
108
CONTROLLER CIRCUIT BOARD
109
MAIN SoC
MAIN CPU
110
MAIN INTERRUPT CONTROLLER
112
120
111
SUB CPU
113
SUB INTERRUPT CONTROLLER
114
IMAGE PROCESSING HARD LOGIC
115
eMMC
118
MAIN CPU FIRMWARE
119
SUB CPU FIRMWARE
RAM
116
ROM
117
101
PRINT SECTION
102
SCAN SECTION
103
USB CONNECTION SECTION
104
NETWORK COMMUNICATION SECTION
105
MODEM
106
POWER SWITCH
107
CONSOLE SECTION NORMAL STATE
POWER-SAVING STATE
POWER-OFF STATE
100
108
CONTROLLER CIRCUIT BOARD
109
MAIN SoC
110
MAIN CPU
112
MAIN INTERRUPT CONTROLLER
120
111
SUB CPU
113
SUB INTERRUPT CONTROLLER
114
IMAGE PROCESSING HARD LOGIC
115
eMMC
116
RAM
117
ROM
101
PRINT SECTION
102
SCAN SECTION
103
USB CONNECTION SECTION
104
NETWORK COMMUNICATION SECTION
105
MODEM
106
POWER SWITCH
107
CONSOLE SECTION NORMAL STATE
POWER-SAVING STATE
POWER-OFF STATE
100
CONTROLLER CIRCUIT BOARD
108
MAIN SoC
109
MAIN CPU
110
MAIN INTERRUPT CONTROLLER
112
120
SUB CPU
111
SUB INTERRUPT CONTROLLER
113
IMAGE PROCESSING HARD LOGIC
114
eMMC
115
RAM
116
ROM
117
PRINT SECTION
101
SCAN SECTION
102
USB CONNECTION SECTION
103
NETWORK COMMUNICATION SECTION
104
MODEM
105
POWER SWITCH
106
CONSOLE SECTION
107

| INTERRUPT SIGNAL | SLEEP MODE | QUICK OFF MODE |
|---|---|---|
| PRINT SECTION | DETECT | MASK |
| SCAN SECTION | DETECT | MASK |
| USB CONNECTION SECTION | DETECT | MASK |
| NETWORK COMMUNICATION SECTION | DETECT | MASK |
| MODEM | DETECT | MASK |
| POWER SWITCH | DETECT | DETECT |
| CONSOLE SECTION | DETECT | MASK |

IMAGE FORMING APPARATUS CAPABLE OF REDUCING TIME OF SHIFT TO LOW-POWER CONSUMPTION OPERATION MODE, METHOD OF CONTROLLING SAME, AND STORAGE MEDIUM

BACKGROUND OF THE INVENTION

Field of the Invention

The present invention relates to an image forming apparatus capable of shifting to a low-power consumption operation mode in a short time, a method of controlling the same, and a storage medium.

Description of the Related Art

There is known an image forming apparatus having a plurality of low-power consumption operation modes, such as a sleep mode and a quick off mode, which are different in return trigger for returning to a normal operation mode. The sleep mode is a mode to which the image forming apparatus shifts e.g. when a user presses a power-saving button. In the sleep mode, supply of electrical power to some of a plurality of units included in the image forming apparatus, such as a scan section and a console section, is limited, i.e., the image forming apparatus shifts to a power-saving state. The quick off mode is a mode to which the image forming apparatus shifts when the user turns off a power switch in a state in which a quick start function has been set to on in advance, enabling the image forming apparatus to more quickly start than normal start processing. In the quick off mode, supply of electrical power to the units of the image forming apparatus is not stopped even when the power switch is turned off. In the quick off mode, the image forming apparatus shifts some of the units to the power-saving state and waits so as to enable quick execution of start processing when the power switch is turned on. In the image forming apparatus, to realize a power-saving operation in the low-power consumption operation modes, such as the sleep mode and the quick off mode, a main CPU which consumes a relatively large amount of electrical power is shifted to the power-saving state, and a sub CPU which consumes a smaller amount of electrical power than the main CPU is activated. In a case where the sub CPU receives an interrupt signal generated when a specific event occurs in the image forming apparatus and the received interrupt signal is an interrupt signal serving as a return trigger, the sub CPU starts the main CPU, and the image forming apparatus returns from the low-power consumption operation mode to the normal operation mode.

In the image forming apparatus, a type of the interrupt signal serving as a return trigger is different for each type of the low-power consumption operation mode, such as the sleep mode and the quick off mode. For example, the interrupt signal serving as a return trigger from the sleep mode includes an interrupt signal generated when an external apparatus is connected to the image forming apparatus via a USB cable and an interrupt signal generated when a sheet is set in a print section of the image forming apparatus. On the other hand, the interrupt signal serving as a return trigger from the quick off mode is e.g. an interrupt signal generated when the user turns on the power switch. In the image forming apparatus having a plurality of low-power consumption operation modes which are different in type of the interrupt signal serving as a return trigger as described above, when the image forming apparatus shifts from the normal operation mode to the low-power consumption operation mode, the main CPU notifies the sub CPU, which receives an interrupt signal, of information related to the type of the interrupt signal serving as a return trigger from the low-power consumption operation mode (see e.g. Japanese Laid-Open Patent Publication (Kokai) No. 2006-259906).

However, in a case where there are many types of the interrupt signal serving as a return trigger, the amount of information transmitted from the main CPU to the sub CPU when the operation mode is switched to the low-power consumption operation mode increases, and the communication time increases. As a result, there arises a problem that it takes a long time to execute processing for shifting the image forming apparatus from the normal operation mode to the low-power consumption operation mode.

SUMMARY OF THE INVENTION

The present invention provides an image forming apparatus capable of reducing execution time of a process for shifting the image forming apparatus from a normal operation mode to a low-power consumption operation mode, a method of controlling the same, and a storage medium.

In a first aspect of the present invention, there is provided an image forming apparatus capable of operating in at least a normal operation mode and a low-power consumption operation mode which is lower in power consumption than the normal operation mode, comprising a first control unit, a second control unit connected to the first control unit, a plurality of units, and a notification unit that is connected to the plurality of units and performs notification to the second control unit in accordance with occurrence of a return trigger in any of the plurality of units, wherein when an operation mode of the image forming apparatus shifts from the normal operation mode to the low-power consumption operation mode, the first control unit transmits mode instruction information indicative of the low-power consumption operation mode to which the operation mode shifts, to the second control unit, and wherein the second control unit stores one or a plurality of units associated with the low-power consumption operation mode in advance, and sets one or a plurality of units in the notification unit, based on the mode instruction information and the plurality of units stored in association with the low-power consumption operation mode.

In a second aspect of the present invention, there is provided a method of controlling an image forming apparatus that is capable of operating in at least a normal operation mode and a low-power consumption operation mode which is lower in power consumption than the normal operation mode, and includes a first control unit, a second control unit connected to the first control unit, a plurality of units, and a notification unit that is connected to the plurality of units and performs notification to the second control unit in accordance with occurrence of a return trigger in any of the plurality of units, the method comprising causing, when an operation mode of the image forming apparatus shifts from the normal operation mode to the low-power consumption operation mode, the first control unit to transmit mode instruction information indicative of the low-power consumption operation mode to which the operation mode shifts, to the second control unit, causing the second control unit to store one or a plurality of units associated with the low-power consumption operation mode in advance; and causing the second control unit to set one or a plurality of units in the notification unit, based on the mode instruction information and the plurality of units stored in association with the low-power consumption operation mode.

In a third aspect of the present invention, there is provided a non-transitory computer-readable storage medium storing a computer-executable program for executing a method of controlling an image forming apparatus that is capable of operating in at least a normal operation mode and a low-power consumption operation mode which is lower in power consumption than the normal operation mode, and includes a first control unit, a second control unit connected to the first control unit, a plurality of units, and a notification unit that is connected to the plurality of units and performs notification to the second control unit in accordance with occurrence of a return trigger in any of the plurality of units, wherein the method comprises causing, when an operation mode of the image forming apparatus shifts from the normal operation mode to the low-power consumption operation mode, the first control unit to transmit mode instruction information indicative of the low-power consumption operation mode to which the operation mode shifts, to the second control unit, causing the second control unit to store one or a plurality of units associated with the low-power consumption operation mode in advance, and causing the second control unit to set one or a plurality of units in the notification unit, based on the mode instruction information and the plurality of units stored in association with the low-power consumption operation mode.

According to the present invention, it is possible to reduce the execution time of the process for shifting the image forming apparatus from the normal operation mode to the low-power consumption operation mode.

Further features of the present invention will become apparent from the following description of exemplary embodiments (with reference to the attached drawings).

BRIEF DESCRIPTION OF THE DRAWINGS

FIG. 6 is a diagram showing an example of return trigger information used for returning the image forming apparatus from a low-power consumption operation mode to a normal operation mode.

DESCRIPTION OF THE EMBODIMENTS

The present invention will now be described in detail below with reference to the accompanying drawings showing embodiments thereof. Although in the present embodiment, a description will be given of a case where the present invention is applied to an image forming apparatus capable of switching between a normal operation mode and a low-power consumption operation mode, the present invention is not limited to the image forming apparatus. For example, the present invention may be applied to any of apparatuses, such as a scanner, a FAX apparatus, a PC, a smartphone, and a tablet terminal, which has a normal operation mode and a low-power consumption operation mode and is capable of switching between the normal operation mode and the low-power consumption operation mode.

Figure 1:
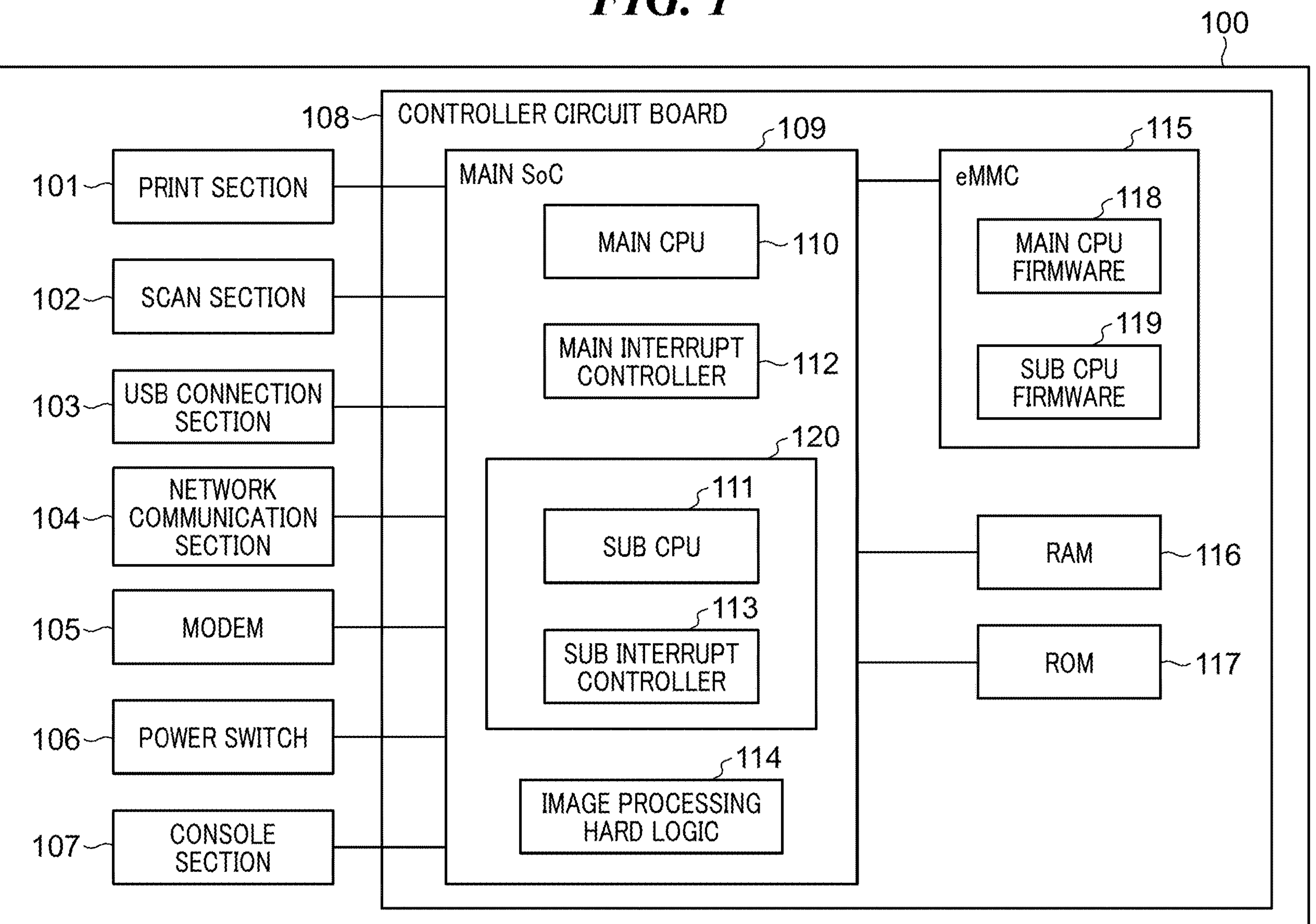
FIG. 1 is a schematic block diagram of an image forming apparatus according to an embodiment of the present invention.

FIG. 1 is a schematic block diagram of an image forming apparatus 100 according to an embodiment of the present invention. Referring to FIG. 1, the image forming apparatus 100 includes a print section 101, a scan section 102, a USB connection section 103, a network communication section 104, a MODEM 105, a power switch 106, a console section 107, and a controller circuit board 108. In the image forming apparatus 100, the print section 101, the scan section 102, the USB connection section 103, the network communication section 104, the MODEM 105, the power switch 106, and the console section 107 are connected to a main SoC 109 of the controller circuit board 108. Note that SoC is an abbreviation of System on a Chip.

The print section 101 is a printer engine that prints an image on a sheet. The print section 101 includes a laser scan unit, photosensitive drums, a sheet conveying unit, etc., none of which are shown. The scan section 102 reads an image or characters on a sheet using a CCD sensor or a CIS sensor, not shown, and converts the read image or characters to image data. The USB connection section 103 is comprised of a USB device controller and a USB device interface (e.g. a Type B), neither of which is shown. The USB connection section 103 is connected to a USB host interface (e.g. a Type A) of an external apparatus, such as a PC, via a USB cable and performs communication with the external apparatus. The network communication section 104 is comprised of a network controller and a wired LAN interface, neither of which is shown. The network communication section 104 performs network communication with an external apparatus connected via a LAN cable. The MODEM 105 is connected to a public telephone line and performs modulation and demodulation processing for transmission and reception of image data. The power switch 106 is a switch used by a user to turn on or off the image forming apparatus 100. The console section 107 is a user interface of the image forming apparatus 100 and is comprised of a touch panel-type liquid crystal display and hard keys.

The controller circuit board 108 incudes the main SoC 109, an eMMC (embedded Multi Media Card) 115, a RAM 116, and a ROM 117. The main SoC 109 is connected to the eMMC 115, the RAM 116, and the ROM 117. The main SoC 109 is an integrated circuit component and includes a main CPU 110, a sub CPU 111, a main interrupt controller 112, a sub interrupt controller 113, and an image processing hard logic 114. The main CPU 110 is a central processing unit for controlling the overall operation of the image forming apparatus 100. In a case where the image forming apparatus 100 shifts to the low-power consumption operation mode, supply of electrical power to the main CPU 110 is limited to a level lower than in the normal operation mode. The low-power consumption operation mode includes a quick off mode and a sleep mode, described hereinafter. On the other hand, even when the image forming apparatus 100 shifts to the low-power consumption operation mode, supply of electrical power to the sub CPU 111 is not limited, and electrical power of substantially the same level as in the normal operation mode is supplied to the sub CPU 111. The sub CPU 111 plays the role of starting the main CPU 110 when the image forming apparatus 100 is in the low-power consumption operation mode. The main interrupt controller 112 transmits an interrupt detection notification to the main CPU 110, indicating that an interrupt signal has been received from a unit when a specific event has occurred therein. The sub interrupt controller 113 transmits an interrupt detection notification to the sub CPU 111, indicating that an interrupt signal has been received from a unit when a specific event has occurred therein. Note that in the following description, a unit formed by the sub CPU 111 and the sub interrupt controller 113 is referred to as a control unit 120. The image processing hard logic 114 performs image processing, such as correction, modification, and editing, on input image data read from the scan section 102. Further, the image processing hard logic 114 performs image processing, such as color conversion, filter processing, and resolution conversion, on output image data to be output to the print section 101. The eMMC 115 is a nonvolatile NAND flash memory for recording data. The eMMC 115 stores e.g. main CPU firmware 118 loaded when starting the main CPU 110 and a sub CPU firmware 119 loaded when starting the sub CPU 111. The RAM 116 is a system work memory for the operation of the main CPU 110 and stores calculation data and programs for the main CPU 110. Further, the RAM 116 is used as an image memory for storing image data subjected to the image processing performed by the image processing hard logic 114. The ROM 117 is a boot ROM and stores a boot program for the image forming apparatus 100.

Next, the sleep mode, a cold off mode, and the quick off mode, which are main modes of the image forming apparatus 100, will be described. In the following description, a state in which necessary electrical power is being supplied to a unit is referred to as the "normal state", a state in which only limited electrical power is being supplied to a unit is referred to as the "power-saving state", and a state in which electrical power is not supplied to a unit is referred to as the "power-off state".

Figure 2:
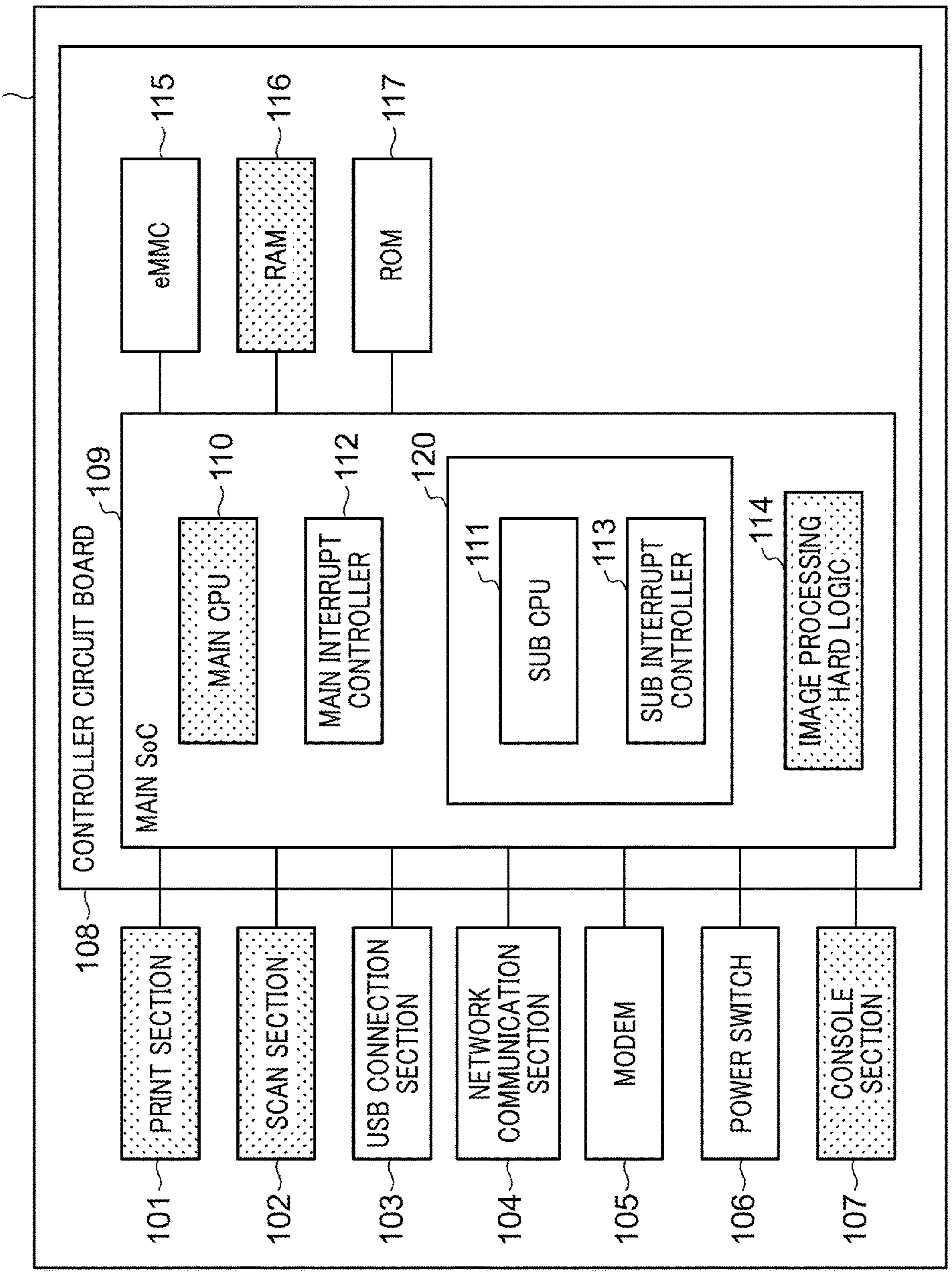
FIG. 2 is a block diagram useful in explaining a state of power supply to units of the image forming apparatus in a sleep mode.

FIG. 2 is a block diagram useful in explaining a state of power supply to the units of the image forming apparatus 100 in the sleep mode. The image forming apparatus 100 shifts to the sleep mode, for example, in a case where the console section 107 has not been operated by the user for a predetermined time period, or a case where the user presses a power-saving button (not shown) of the console section 107. When the image forming apparatus 100 shifts to the sleep mode, as shown in FIG. 2, some of the units, specifically, the print section 101, the scan section 102, and the console section 107 are shifted from the normal state to the power-saving state. Further, the main CPU 110, the image processing hard logic 114, and the RAM 116 of the controller circuit board 108 are shifted from the normal state to the power-saving state. In the image forming apparatus 100 in the sleep mode, when the sub CPU 111 receives an interrupt signal serving as a return trigger, the sub CPU 111 starts the main CPU 110 in the power-saving mode and the image forming apparatus 100 returns from the sleep mode to the normal operation mode.

Figure 3:
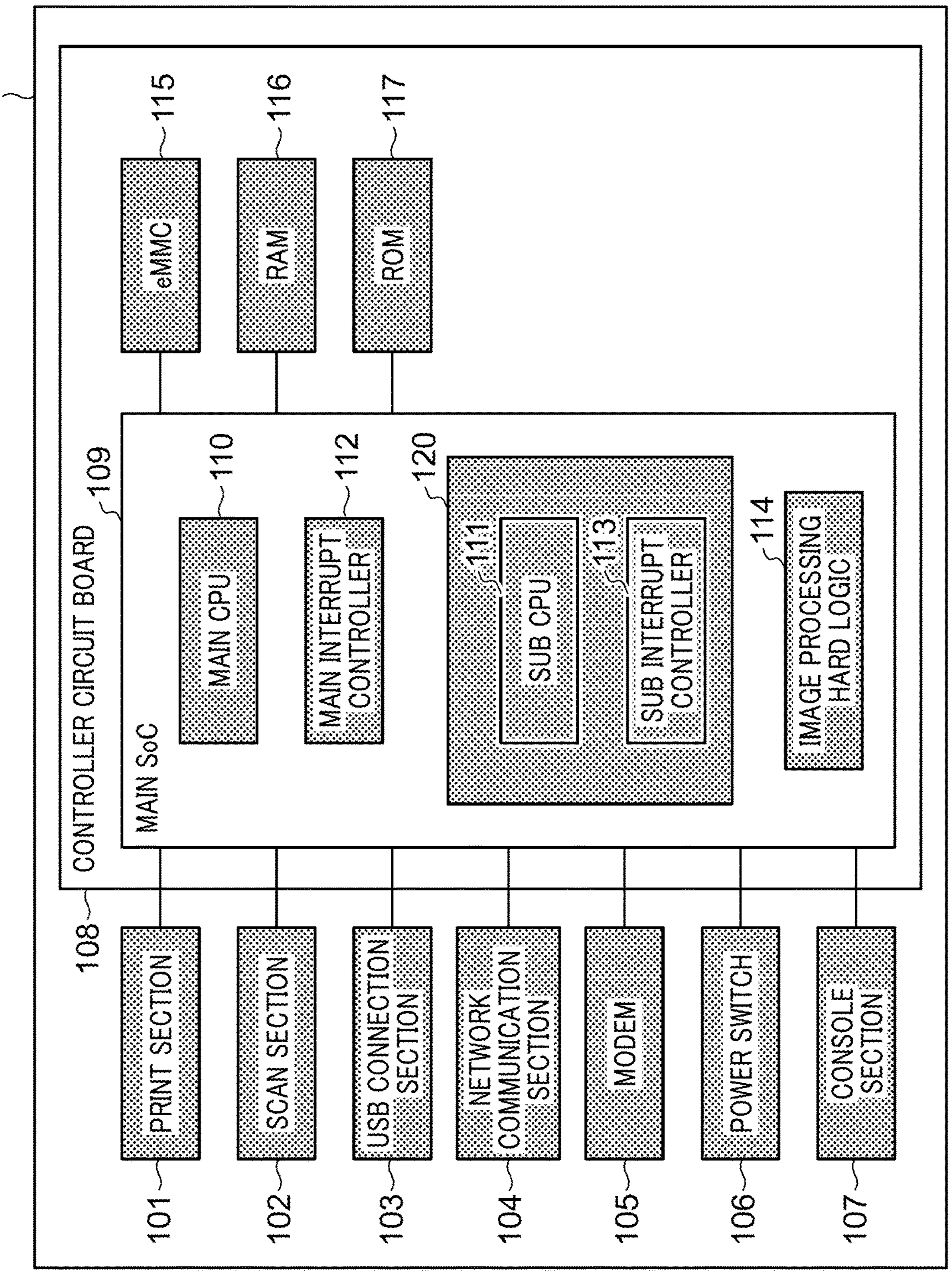
FIG. 3 is a block diagram useful in explaining a state of power supply to the units of the image forming apparatus in a cold off mode.

FIG. 3 is a block diagram useful in explaining a state of power supply to the units of the image forming apparatus 100 in the cold off mode. When the user turns the power switch 106 from on to off, the image forming apparatus 100 shifts to the cold off mode in which supply of electrical power to the image forming apparatus 100 is stopped. When the image forming apparatus 100 shifts to the cold off mode, as shown in FIG. 3, all units in the image forming apparatus 100 are shifted to the power-off state.

Figure 4:
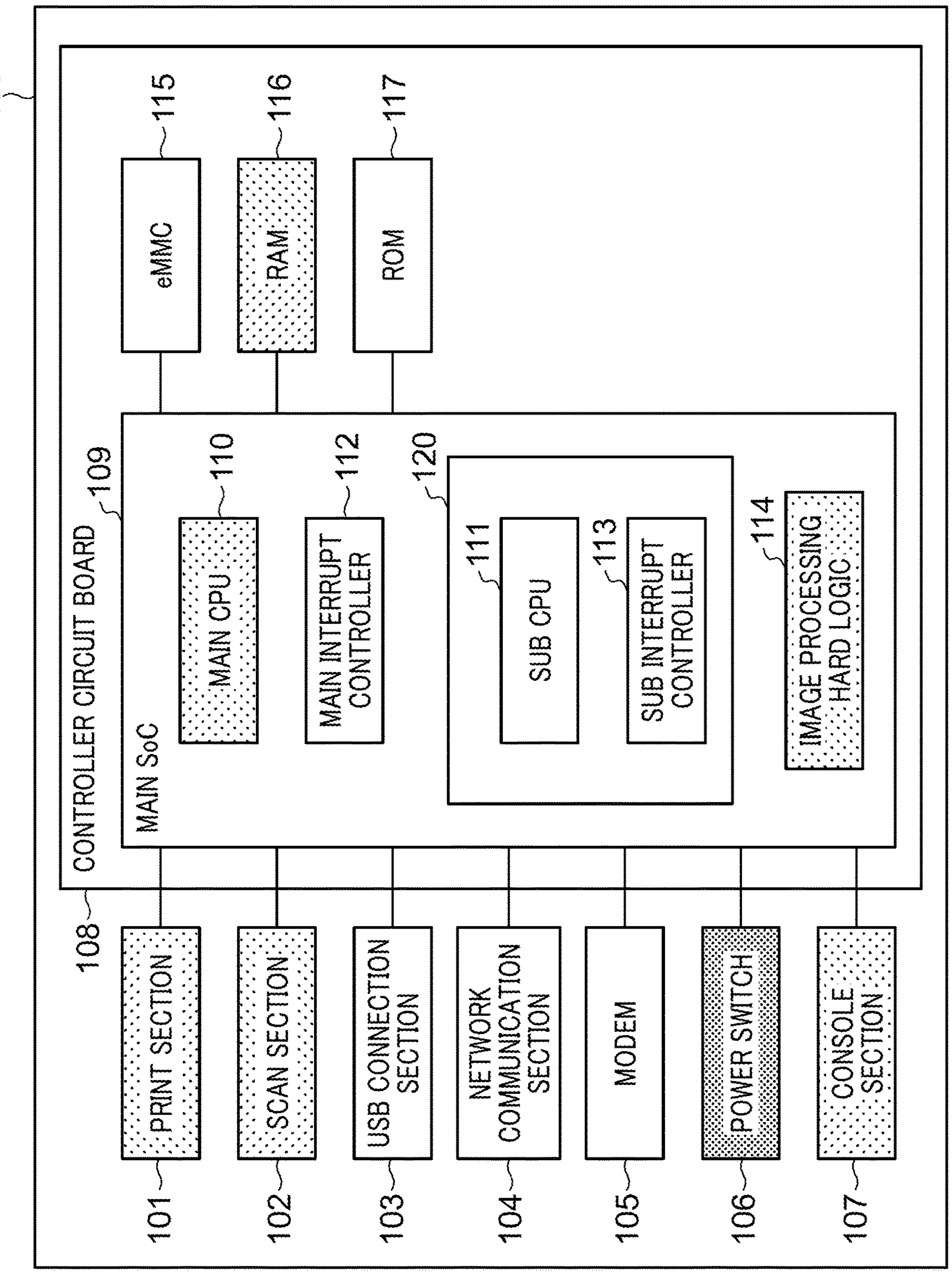
FIG. 4 is a block diagram useful in explaining a state of power supply to the units of the image forming apparatus in a quick off mode.

FIG. 4 is a block diagram useful in explaining a state of power supply to the units in the image forming apparatus 100 in the quick off mode. The image forming apparatus 100 shifts to the quick off mode in a case where the user turns the power switch 106 from on to off in a state in which a quick start function for enabling the image forming apparatus 100 to more quickly start than in the normal start processing has been set to on using the console section 107 in advance. When the image forming apparatus 100 shifts to the quick off mode, as shown in FIG. 4, the power switch 106 is shifted to the power-off state, and some of the units, specifically, the print section 101, the scan section 102, and the console section 107 are shifted from the normal state to the power-saving state. Further, the main CPU 110, the image processing hard logic 114, and the RAM 116 of the controller circuit board 108 are shifted from the normal state to the power-saving state. Thus, in the quick off mode, electrical power continues to be supplied to each unit even after the power switch 106 has been turned from on to off. With this, when the user turns the power switch 106 from off to on, the image forming apparatus 100 can more quickly return to the normal operation mode using information of the last activated state than in a case where the image forming apparatus 100 returns to the normal operation mode from the cold off mode.

In the present embodiment, the sleep mode and the quick off mode are different in the condition for shifting to each mode, but are the same in the power supply state of the units, except the power switch 106, of the image forming apparatus 100 after shifting to each mode.

Figure 5:
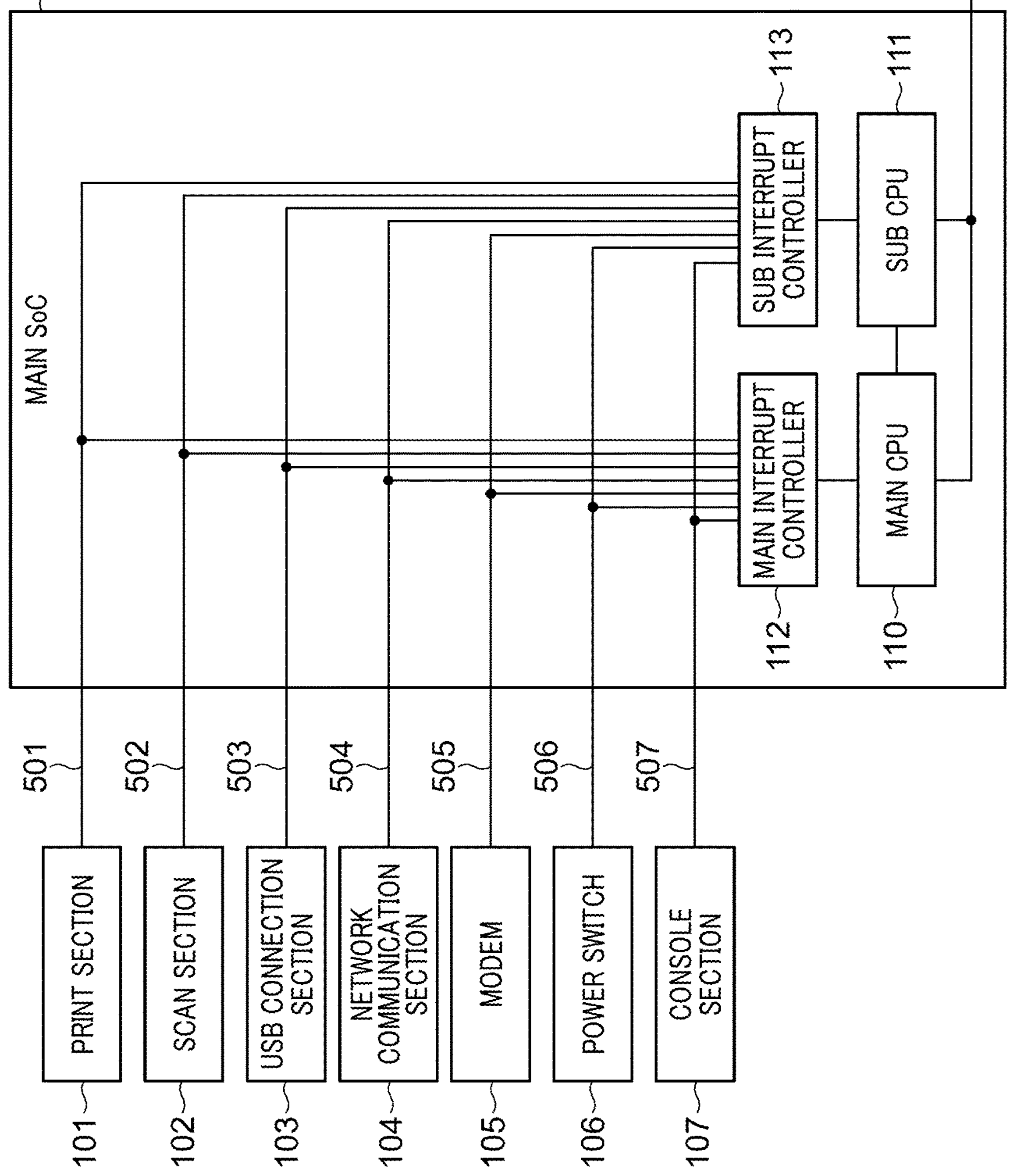
FIG. 5 is a connection diagram useful in explaining transmission of interrupt signals from the units of the image forming apparatus to a main SoC.

FIG. 5 is a connection diagram useful in explaining transmission of interrupt signals from the units of the image forming apparatus 100 shown in FIG. 1 to the main SoC 109. Each unit of the image forming apparatus 100 transmits an interrupt signal to the main SoC 109 based on occurrence of a specific event. For example, the print section 101 transmits a print sheet detection signal 501, which is an interrupt signal to the main SoC 109, when a sheet for printing image data is set in the print section 101. The scan section 102 transmits a reading sheet detection signal 502, which is an interrupt signal to the main SoC 109, when an original is set on the scan section 102. The USB connection section 103 transmits a VBUS detection signal 503, which is an interrupt signal to the main SoC 109, when a PC connected via a USB cable (not shown) is started and electrical power is supplied via a VBUS (power supply line) to a USB device (not shown).

The network communication section 104 transmits a link signal 504, which is an interrupt signal from the network controller, to the main SoC 109 when the network controller of the network communication section 104 receives a print job e.g. from a PC via a network. The MODEM 105 transmits a MODEM_INT signal 505, which is an interrupt signal to the main SoC 109, when a request for printing image data is received via a public telephone line. The power switch 106 transmits a power switch signal 506, which is an interrupt signal to the main SoC 109, when the user turns the power switch from on to off or from off to on. The console section 107 transmits a power-saving signal 507, which is an interrupt signal to the main SoC 109, when the user presses the power-saving button of the console section 107.

In the image forming apparatus 100, as shown in FIG. 5, an interrupt signal transmitted from each unit is received by the main interrupt controller 112 and the sub interrupt controller 113 of the main SoC 109. The main interrupt controller 112 transmits an interrupt detection notification indicating the type of the received interrupt signal to the main CPU 110. The sub interrupt controller 113 transmits the interrupt detection notification to the sub CPU 111. Here, as described hereinabove, in a case where the image forming apparatus 100 is in the sleep mode or the quick off mode, the main CPU 110 is in the power-saving state, in which the main CPU 110 cannot receive an interrupt detection notification from the main interrupt controller 112. For this reason, even when an interrupt signal is received from any of the units, the main interrupt controller 112 does not transmit an interrupt detection notification to the main CPU 110 and waits until the main CPU 110 returns from the power-saving state to the normal state.

On the other hand, in the case where the image forming apparatus 100 is in the sleep mode or the quick off mode, the sub CPU 111 is in the normal state, in which the sub CPU 111 can receive an interrupt detection notification from the sub interrupt controller 113. Therefore, when the sub interrupt controller 113 receives an interrupt signal from any of the units, the sub interrupt controller 113 transmits an interrupt detection notification to the sub CPU 111, depending on conditions described below. The sub CPU 111 having received the interrupt detection notification causes the main CPU 110 to be started to return from the power-saving state to the normal state. The main CPU 110 having returned to the normal state identifies the type of the received interrupt signal based on the interrupt detection notification acquired from the main interrupt controller 112 and executes a return sequence based on the identified type of the received interrupt signal. In the present embodiment, the sub interrupt controller 113 transmits the interrupt detection notification to the sub CPU 111 when an interrupt signal is received for which information indicating that it is a return trigger is set in return trigger information 600 shown in FIG. 6. Further, the sub interrupt controller 113 does not transmit an interrupt detection notification to the sub CPU 111 when an interrupt signal is received for which information indicating that it is not a return trigger is set in the return trigger information 600. This makes it possible to prevent the image forming apparatus 100 from unintentionally returning from the low-power consumption operation mode to the normal operation mode due to occurrence of an event irrelevant to the return to the normal operation mode.

FIG. 6 is a diagram showing an example of the return trigger information 600 used when the image forming apparatus 100 shown in FIG. 1 returns from the low-power consumption operation mode to the normal operation mode. The return trigger information 600 is stored in the sub CPU firmware 119 stored in the eMMC 115 and is loaded into a memory (not shown) of the sub CPU 111 when starting the sub CPU 111 or when performing reset release of the sub CPU 111. In the return trigger information 600, information indicative of whether or not an interrupt signal transmitted from each unit is a return trigger is set on a mode-by-mode basis. In the return trigger information 600, "detect" is set for an interrupt signal which is a return trigger, and "mask" is set for an interrupt signal which is not a return trigger.

For example, in the return trigger information 600, "detect" is set for all interrupt signals in the sleep mode. Based on this setting, when a specific event occurs in any of the print section 101, the scan section 102, the USB connection section 103, the network communication section 104, the MODEM 105, the power switch 106, and the console section 107, and an interrupt signal responsive thereto is generated thereby, the image forming apparatus 100 returns from the sleep mode to the normal operation mode. For example, when a specific event occurs in the power switch 106, the image forming apparatus 100 returns from the sleep mode to the normal operation mode. Here, in a case where the image forming apparatus 100 is in the sleep mode, the power switch 106 is in the on-state. The image forming apparatus 100 returns from the sleep mode to the normal operation mode based on the power switch signal 506 generated when the user turns the power switch 106 from on to off. After that, the image forming apparatus 100 immediately starts a shutdown sequence.

Further, in the return trigger information 600, "detect" is set only for the interrupt signal generated by the power switch 106, out of the interrupt signals generated by the above-mentioned units in the quick off mode. Based on this setting, the image forming apparatus 100 returns from the quick off mode to the normal operation mode only in a case where a specific event occurs in the power switch 106 and an interrupt signal responsive thereto is generated. Here, in a case where the image forming apparatus 100 is in the quick off mode, the power switch 106 is in the off-state. The image forming apparatus 100 returns from the quick off mode to the normal operation mode based on the power switch signal 506 generated when the user turns the power switch 106 from off to on. On the other hand, even when an interrupt signal is transmitted from a unit other than the power switch 106, the image forming apparatus 100 does not return from the quick off mode to the normal operation mode. This makes it possible to prevent the image forming apparatus 100 from returning to the normal operation mode due to occurrence of a specific event in any other unit than the power switch 106, in spite of the power switch 106 being in the off-state.

Figure 7:
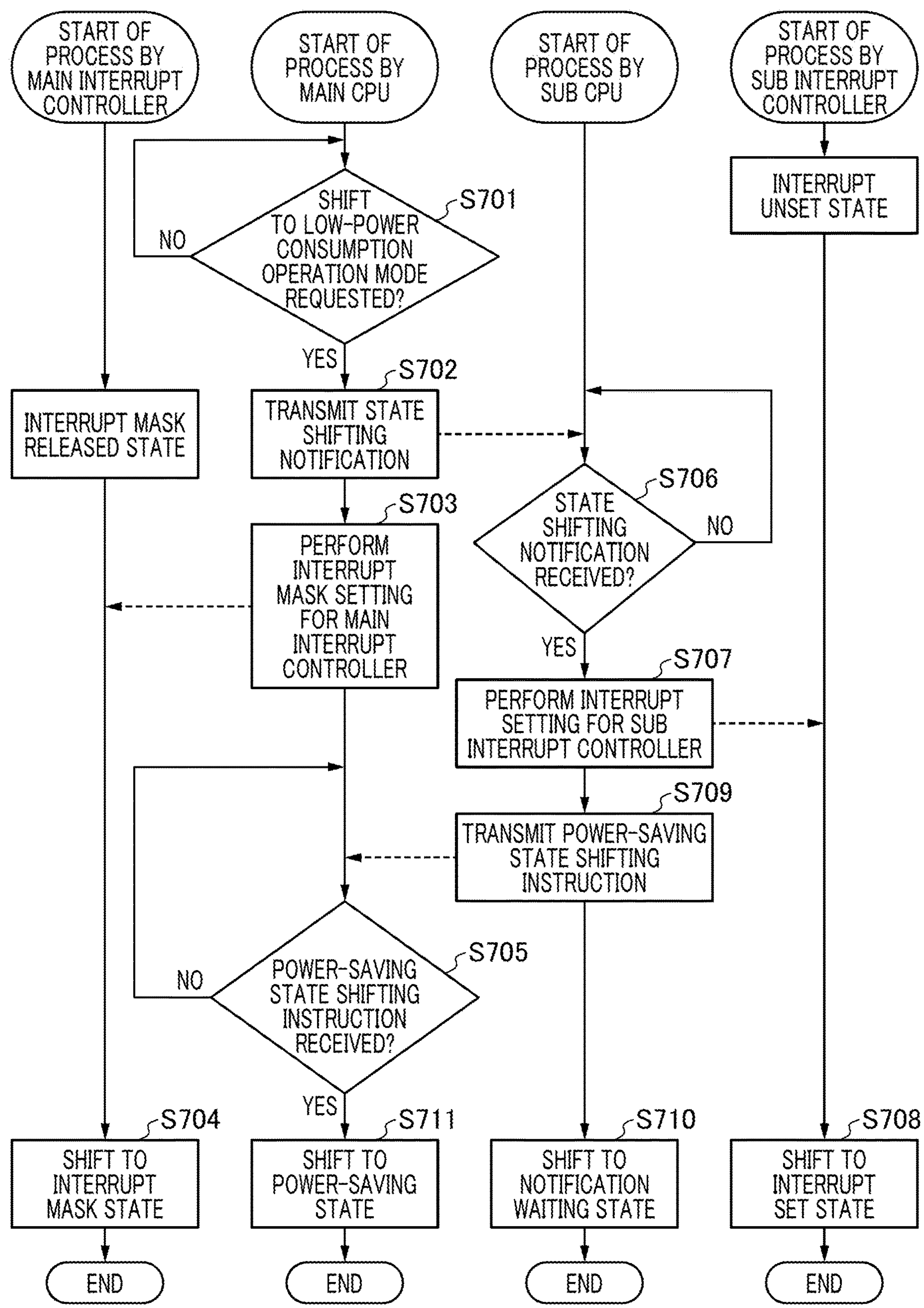
FIG. 7 is a flowchart of a process for shifting the image forming apparatus from the normal operation mode to the low-power consumption operation mode.

FIG. 7 is a flowchart of a process for shifting the image forming apparatus 100 shown in FIG. 1 from the normal operation mode to the low-power consumption operation mode.

Referring to FIG. 7, first, the main CPU 110 of the image forming apparatus 100 in the normal operation mode waits until the shift to the low-power consumption operation mode is requested (step S701). In the step S701, for example, in a case where the console section 107 has not been operated by the user for a predetermined time period, a case where the user presses the power-saving button of the console section 107, or a case where the user turns the power switch 106 from on to off in a state in which the quick start function has been set to on in advance, the main CPU 110 determines that the shift to the low-power consumption operation mode is requested. If the shift to the low-power consumption operation mode is requested (YES to the step S701), the main CPU 110 transmits a state shifting notification (mode instruction information) to the sub CPU 111, indicating to which of the sleep mode and the quick off mode the image forming apparatus 100 is to be shifted (step S702). In the step S702, for example, in a case where the console section 107 has not been operated by the user for the predetermined time period or a case where the user presses the power-saving button of the console section 107, the main CPU 110 transmits to the sub CPU 111 a state shifting notification that the image forming apparatus 100 is to be shifted to the sleep mode. On the other hand, in a case where the user turns the power switch 106 from on to off in a state in which the quick start function has been set to on in advance, the main CPU 110 transmits to the sub CPU 111 a state shifting notification that the image forming apparatus 100 is to be shifted to the quick off mode.

Then, the main CPU 110 performs interrupt mask setting for the main interrupt controller 112 (step S703). With this, the main interrupt controller 112 shifts from an external signal interrupt mask released state to an external signal interrupt mask state (step S704). The main interrupt controller 112 having shifted to the external signal interrupt mask state holds an interrupt signal received from each unit as long as the image forming apparatus 100 stays in the low-power consumption operation mode. Thus, in the present embodiment, when an interrupt signal is transmitted from each unit during a time period in which supply of electrical power to the main CPU 110 is limited and hence the main CPU 110 cannot receive an interrupt detection notification from the main interrupt controller 112, the received interrupt signal is held. Then, the main CPU 110 waits until a power-saving state shifting instruction is received from the sub CPU 111 (step S705).

When the state shifting notification transmitted from the main CPU 110 in the step S702 is received (YES to a step S706), the sub CPU 111 performs interrupt setting for the sub interrupt controller 113 (step S707). In the step S707, the sub CPU 111 performs the interrupt setting for the sub interrupt controller 113 based on the return trigger information 600 stored in the sub CPU firmware 119 and the received state shifting notification. For example, in a case where the received state shifting notification indicates the sleep mode, the sub CPU 111 performs the interrupt setting for the sub interrupt controller 113 based on settings associated with the sleep mode in the return trigger information 600. With this, all interrupt signals are set as the interrupt signal serving as a return trigger. Further, in a case where the received state shifting notification indicates the quick off mode, the sub CPU 111 performs the interrupt setting for the sub interrupt controller 113 based on settings associated with the quick off mode in the return trigger information 600. With this, only an interrupt signal output from the power switch 106 is set as the interrupt signal serving as a return trigger. The sub interrupt controller 113 shifts from an interrupt unset state to an interrupt set state according to the interrupt setting performed for the sub interrupt controller 113 (step S708).

Then, the sub CPU 111 transmits the power-saving state shifting instruction to the main CPU 110 (step S709). Then, the sub CPU 111 shifts to a notification waiting state for waiting for a notification sent from the sub interrupt controller 113 (step S710), followed by terminating the process performed by the sub CPU 111.

When the power-saving state shifting instruction transmitted from the sub CPU 111 in the step S709 is received (YES to the step S705), the main CPU 110 shifts to the power-saving state (step S711), followed by terminating the process performed by the main CPU 110.

Figure 8:
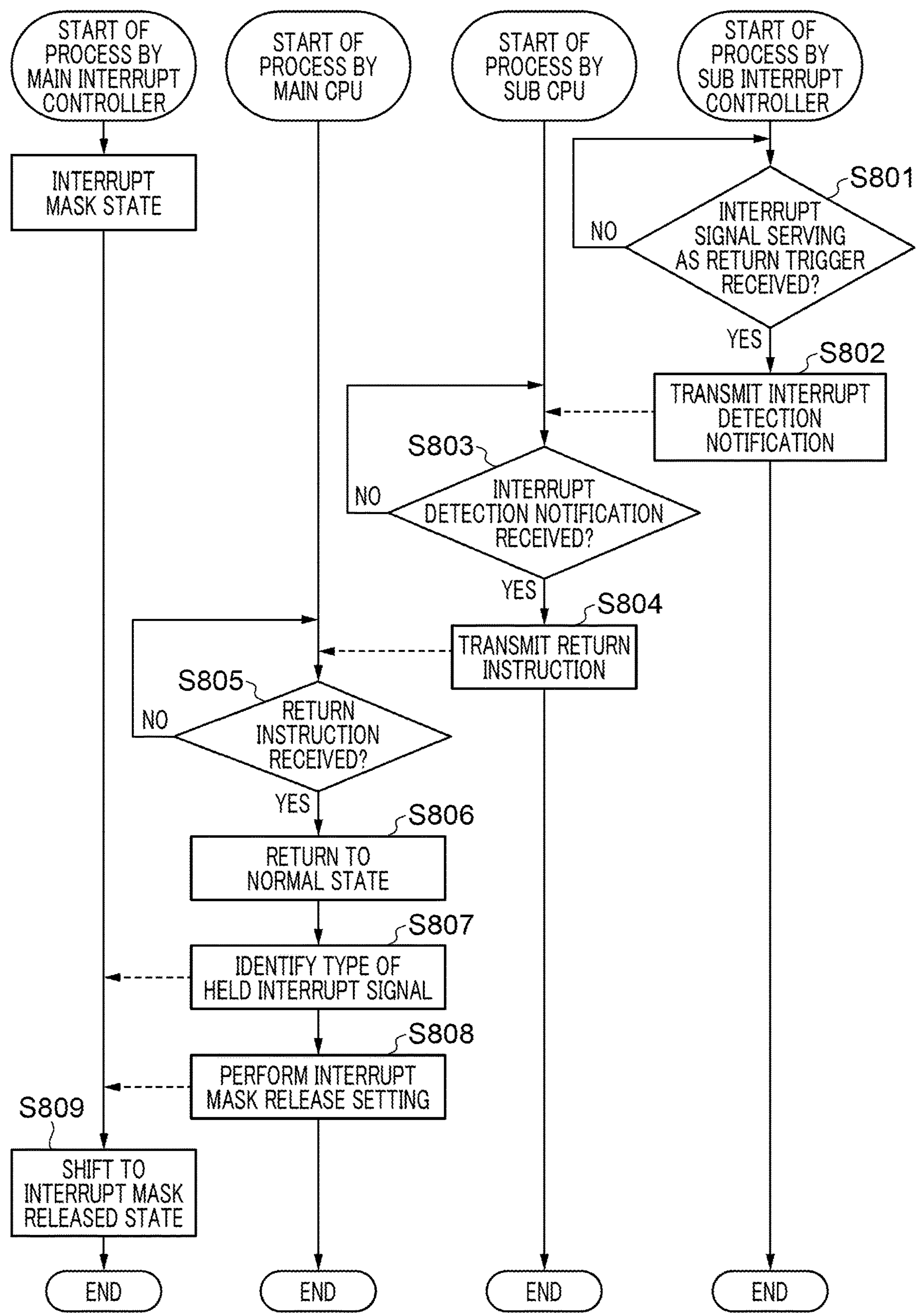
FIG. 8 is a flowchart of a process for returning the image forming apparatus from the low-power consumption operation mode to the normal operation mode.

FIG. 8 is flowcharts of a process for causing the image forming apparatus 100 shown in FIG. 1 to return from the low-power consumption operation mode to the normal operation mode.

Referring to FIG. 8, the sub interrupt controller 113 of the control unit 120 determines whether or not a received interrupt signal is an interrupt signal serving as a return trigger, based on the interrupt setting performed by the sub CPU 111 in the step S707 based on the return trigger information 600 and the state shifting notification transmitted from the main CPU 110 in the step S702 (step S801). If the received interrupt signal is an interrupt signal serving as a return trigger (YES to the step S801), the sub interrupt controller 113 transmits an interrupt detection notification to the sub CPU 111 (step S802), followed by terminating the process performed by the sub interrupt controller 113.

When the interrupt detection notification is received from the sub interrupt controller 113 (YES to a step S803), the sub CPU 111 transmits a return instruction for causing the main CPU 110 to return from the power-saving state to the normal state to the main CPU 110 (step S804), followed by terminating the process performed by the sub CPU 111.

When the return instruction is received from the sub CPU 111 (YES to a step S805), the main CPU 110 returns from the power-saving state to the normal state (step S806). Then, the main CPU 110 accesses the main interrupt controller 112 and identifies the type of the interrupt signal held in the main interrupt controller 112 (step S807). Then, the main CPU 110 executes a return sequence. In the return sequence, each processing is executed according to the priority order set in advance in association with the identified type. Further, the main CPU 110 performs interrupt mask release setting for the main interrupt controller 112 (step S808). After that, the main CPU 110 terminates the process to be performed thereby.

The main interrupt controller 112 clears the interrupt signal held therein according to the interrupt mask release setting set by the main CPU 110. Further, the main interrupt controller 112 shifts from the interrupt mask state to the interrupt mask released state (step S809), followed by terminating the process performed by the main interrupt controller 112.

According to the above-described embodiment, the main CPU 110 transmits a state shifting notification to the sub CPU 111 when the main CPU 110 shifts from the normal operation mode to the low-power consumption operation mode. The control unit 120 stores the return trigger information 600 in advance and determines, based on the state shifting notification and the return trigger information 600, whether or not an interrupt signal received while the image forming apparatus 100 stays in the low-power consumption operation mode is an interrupt signal serving as a return trigger. This makes it possible, when the image forming apparatus 100 shifts from the normal operation mode to the low-power consumption operation mode, to reduce the amount of information to the minimum, which is required to be transmitted from the main CPU 110 to the sub CPU 111 so as to determine whether or not a received interrupt signal is an interrupt signal serving as a return trigger, and thereby reduce the communication time. As a result, it is possible to reduce the execution time of the process for shifting the image forming apparatus 100 from the normal operation mode to the low-power consumption operation mode.

In the above-described embodiment, in a case where the image forming apparatus 100 shifts to the low-power consumption operation mode, the main CPU 110 shifts to the power-saving state in which supply of electrical power thereto is limited. Further, the sub CPU 111 operates with lower electrical power than the main CPU 110 and starts the main CPU 110 in the power-saving state. This makes it possible, for the image forming apparatus 100 configured such that the sub CPU 111 starts the main CPU 110 when the image forming apparatus 100 returns from the low-power consumption operation mode, to reduce the execution time of the process for shifting the image forming apparatus 100 from the normal operation mode to the low-power consumption operation mode.

In the above-described embodiment, the plurality of low-power consumption operation modes include the quick off mode in which when the power switch 106 of the image forming apparatus 100 is turned off, supply of electrical power to some of the units of the mage forming apparatus 100 is limited without stopping supply of electrical power to the mage forming apparatus 100. This makes it possible to reduce the execution time of the process for shifting the mage forming apparatus 100 from the normal operation mode to the quick off mode.

In the above-described embodiment, the return trigger information 600 is stored in the sub CPU firmware 119 loaded when starting the system of the sub CPU 111. This makes it possible to positively use the return trigger information 600 when determining whether or not a received interrupt signal is an interrupt signal serving as a return trigger.

In the above-described embodiment, the return trigger information 600 includes the information indicating whether or not each of a plurality of interrupt signals generated in the image forming apparatus 100 is an interrupt signal serving as a return trigger. This makes it possible to determine whether or not a received interrupt signal is an interrupt signal serving as a return trigger even when the amount of information transmitted from the main CPU 110 to the sub CPU 111 when the image forming apparatus 100 shifts from the normal operation mode to the low-power consumption operation mode is reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-160642 filed Sep. 3, 2019, which is hereby incorporated by reference herein in its entirety.

What is claimed is:

1. An image forming apparatus capable of operating in at least a normal operation mode, a first low-power consumption operation mode which is lower in power consumption than the normal operation mode and a second low-power consumption operation mode which is lower in power consumption than the normal operation mode, comprising:

a first control unit;

a second control unit connected to the first control unit;

a plurality of units;

a notification unit that is connected to the plurality of units and performs notification to the second control unit in accordance with a return trigger in any of the plurality of units; and a storing unit that stores information indicating one or more of the plurality of units associated with the first low-power consumption operation mode, and information indicating one or more of the plurality of units associated with the second low-power consumption operation mode, wherein, when an operation mode of the image forming apparatus shifts from the normal operation mode to the first low-power consumption operation mode or the second low-power consumption operation mode, the first control unit transmits mode information indicative of the first low-power consumption operation mode or the second low-power consumption operation mode, to the second control unit, and wherein the second control unit sets information indicative of one or more of the plurality of units each of which generates an interrupt signal not serving as the return trigger, in the notification unit, based on the mode information and the information stored in the storing unit.

2. The image forming apparatus according to claim 1, wherein the second control unit sets the one or more of the plurality of units in the notification unit, in accordance with reception of the mode information, and gives, to the first control unit, an instruction for shifting to a power-saving state in which supply of electrical power is limited.

3. The image forming apparatus according to claim 2, wherein the first control unit shifts to the power-saving state in accordance with the instruction from the second control unit.

4. The image forming apparatus according to claim 2, wherein the second control unit operates with lower electrical power than the first control unit.

5. The image forming apparatus according to claim 3, wherein the second control unit starts the first control unit in the power-saving state in accordance with the notification from the notification unit.

6. The image forming apparatus according to claim 1, wherein the image forming apparatus has a plurality of different low-power consumption operation modes, and wherein the plurality of low-power consumption operation modes includes a low-power consumption operation mode in which, when a power switch of the image forming apparatus is turned off, supply of electrical power to some of components of the image forming apparatus is limited without stopping supply of electrical power to the image forming apparatus.

7. The image forming apparatus according to claim 1, wherein return triggers in the plurality of units are stored in firmware loaded when starting a system of the second control unit.

8. The image forming apparatus according to claim 1, wherein the second control unit sets information indicating whether or not each of a plurality of interrupt signals generated in the plurality of units, respectively, is an interrupt signal serving as the return trigger.

9. A method of controlling an image forming apparatus that is capable of operating in at least a normal operation mode, a first low-power consumption operation mode which is lower in power consumption than the normal operation mode and a second low-power consumption operation mode which is lower in power consumption than the normal operation mode, and includes a first control unit, a second control unit connected to the first control unit, a plurality of units, a notification unit that is connected to the plurality of units and performs notification to the second control unit in accordance with a return trigger in any of the plurality of units, and a storing unit that stores information indicating one or more of the plurality of units associated with the first low-power consumption operation mode, and information indicating one or more of the plurality of units associated with the second low-power consumption operation mode, the method comprising:

causing, when an operation mode of the image forming apparatus shifts from the normal operation mode to the first low-power consumption operation mode or the second low-power consumption operation mode, the first control unit to transmit mode information indicative of the first low-power consumption operation mode or the second low-power consumption operation mode, to the second control unit;

and causing the second control unit to set information indicative of one or more of the plurality of units each of which generates an interrupt signal not serving as the return trigger, in the notification unit, based on the mode information and the information stored in the storing unit.

10. The method according to claim 9, wherein the second control unit sets the one or more of the plurality of units in the notification unit, in accordance with reception of the mode information, and gives, to the first control unit, an instruction for shifting to a power-saving state in which supply of electrical power is limited.

11. The method according to claim 10, wherein the first control unit shifts to the power-saving state in accordance with the instruction from the second control unit.

12. The method according to claim 10, wherein the second control unit operates with lower electrical power than the first control unit.

13. The method according to claim 11, wherein the second control unit starts the first control unit in the power-saving state in accordance with notification from the notification unit.

14. The method according to claim 9, wherein the image forming apparatus has a plurality of different low-power consumption operation modes, and wherein the plurality of low-power consumption operation modes includes a low-power consumption operation mode in which, when a power switch of the image forming apparatus is turned off, supply of electrical power to some of components of the image forming apparatus is limited without stopping supply of electrical power to the image forming apparatus.

15. The method according to claim 9, wherein return triggers in the plurality of units are stored in firmware loaded when starting a system of the second control unit.

16. The method according to claim 9, wherein the second control unit sets information indicating whether or not each of a plurality of interrupt signals generated in the plurality of units, respectively, is an interrupt signal serving as the return trigger.

17. A non-transitory computer-readable storage medium storing a computer-executable program for executing a method of controlling an image forming apparatus that is capable of operating in at least a normal operation mode, a first low-power consumption operation mode which is lower in power consumption than the normal operation mode and a second low-power consumption operation mode which is lower in power consumption than the normal operation mode, and includes a first control unit, a second control unit connected to the first control unit, a plurality of units, a notification unit that is connected to the plurality of units and performs notification to the second control unit in accordance with a return trigger in any of the plurality of units, and a storing unit that stores information indicating one or more of the plurality of units associated with the first low-power consumption operation mode, and information indicating one or more of the plurality of units associated with the second low-power consumption operation mode, wherein the method comprises:

causing, when an operation mode of the image forming apparatus shifts from the normal operation mode to the first low-power consumption operation mode or the second low-power consumption operation mode, the first control unit to transmit mode information indicative of the first low-power consumption operation mode or the second low-power consumption operation mode, to the second control unit;

and causing the second control unit to set information indicative of one or more of the plurality of units each of which generates an interrupt signal not serving as the return trigger, in the notification unit, based on the mode information and the information stored in the storing unit.

* * * * *